United States Patent
Meunier et al.

(10) Patent No.: US 10,343,321 B2
(45) Date of Patent: Jul. 9, 2019

(54) EXTRUDER DIE ASSEMBLY

(71) Applicant: The Goodyear Tire & Rubber Company, Akron, OH (US)

(72) Inventors: Michel Jacques Albert Ghislain Meunier, Gouvy (BE); Jean Luc Dheur, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 694 days.

(21) Appl. No.: 14/975,937

(22) Filed: Dec. 21, 2015

(65) Prior Publication Data
US 2017/0173837 A1    Jun. 22, 2017

(51) Int. Cl.
| | |
|---|---|
| *B29C 47/06* | (2006.01) |
| *B29C 47/56* | (2006.01) |
| *B29C 48/21* | (2019.01) |
| *B29C 48/30* | (2019.01) |
| *B29C 48/25* | (2019.01) |

(Continued)

(52) U.S. Cl.
CPC .......... *B29C 48/21* (2019.02); *B29C 48/2566* (2019.02); *B29C 48/25686* (2019.02); *B29C 48/30* (2019.02); *B29C 48/3001* (2019.02); *B29C 48/307* (2019.02); *B29C 48/49* (2019.02); *B29K 2021/00* (2013.01); *B29L 2009/00* (2013.01)

(58) Field of Classification Search
CPC .............. B29C 47/065; B29C 47/0808; B29C 47/0828; B29C 47/0837; B29C 47/085; B29C 47/145; B29C 47/56; B29C 48/21; B29C 48/2566; B29C 48/25686; B29C 48/30; B29C 48/3001; B29C 48/307; B29C 48/49
See application file for complete search history.

(56) References Cited

U.S. PATENT DOCUMENTS

| | | | |
|---|---|---|---|
| 6,294,119 B1 * | 9/2001 | Nakamura | ............ B29C 47/062 152/152.1 |
| 7,198,744 B2 | 4/2007 | Peronnet-Paquin et al. | |

(Continued)

FOREIGN PATENT DOCUMENTS

| | | |
|---|---|---|
| CN | 1524035 A | 9/2005 |
| CN | 101704294 A | 5/2010 |

(Continued)

OTHER PUBLICATIONS

Machine English translation of JP-2007223271-A, Sep. 2007.*

(Continued)

*Primary Examiner* — Joseph S Del Sole
*Assistant Examiner* — Joseph S Leyson
(74) *Attorney, Agent, or Firm* — June E. Rickey

(57) ABSTRACT

An extruder assembly for forming a multi-layered composite is described, the extruder assembly includes an extruder head having a first and second flow passage, a first and second extruder in fluid communication with the respective first and second flow passage, and a splice bar having a first and second passageway extending from a rear side to an outlet side, and communicating flow from the first and second passageway to an outlet die. The splice bar further includes a groove located on the rear side of the splice bar and being positioned between the first and second passageway.

7 Claims, 4 Drawing Sheets

(51) Int. Cl.
　　　*B29C 48/305*　　(2019.01)
　　　*B29C 48/49*　　(2019.01)
　　　*B29K 21/00*　　(2006.01)
　　　*B29L 9/00*　　(2006.01)

(56) References Cited

U.S. PATENT DOCUMENTS

2004/0070105 A1　4/2004　Rasmussen
2005/0208167 A1　9/2005　You et al.
2010/0015267 A1　1/2010　Keller et al.
2010/0289173 A1　11/2010　Dheur et al.
2012/0148702 A1　6/2012　Herndon et al.
2013/0123424 A1　5/2013　Kowalski
2014/0115690 A1　4/2014　Huang et al.
2014/0116590 A1　5/2014　Dixon et al.

FOREIGN PATENT DOCUMENTS

| CN | 103906617 A | | 7/2014 |
|----|-------------|---|--------|
| CN | 103935004 A | | 7/2014 |
| EP | 1388405 A1 | | 2/2004 |
| GB | 661556 | | 11/1951 |
| JP | 2004230593 A | | 8/2004 |
| JP | 2007223271 A | * | 9/2007 |
| JP | 2007223271 A | | 9/2007 |

OTHER PUBLICATIONS

Chinese Search Report dated Jun. 29, 2017 for Application Serial No. 201510975046.X.
European Search Report dated May 12, 2016 for Application Serial No. 15200664.

* cited by examiner

EXTRUDER DIE ASSEMBLY

FIELD OF THE INVENTION

The invention relates to the field of tire manufacturing, and more particularly to extrusion of rubber.

BACKGROUND OF THE INVENTION

In tire manufacturing, numerous tire components are formed of a plurality of rubber parts. Rubber tire components such as the tire apex, sidewall, and tread are formed by an extrusion process. One type of extruder typically used in tire manufacturing is a screw extruder. The screw extruder typically has a long chamber with a screw centered in the channel, wherein the screw masticates the rubber. The end of the channel typically has a die having a hole formed therein. The shape of the hole dictates the cross-sectional shape of the rubber part to be made. The extruder pressure forces the rubber through the small die hole forming the part to be made in a continuous manner The desired rubber part is obtained by cutting the extruded part to a given length.

The invention relates to coextrusion of tie components. Co-extrusion is the manufacture of a multi-layered rubber composite in a single operation. The multi-layered rubber composite is composed of at least two individual rubber compositions configured as rubber layers, wherein each rubber layer extends through the rubber composite thickness from one side to the other opposing side. The multi-layered rubber composite is prepared by co-extruding at least two individual rubber compositions, via an individual extruder for each rubber composition, to an internal cavity of a head. The head is comprised of an internal cavity which contains flow channels for guiding the at least two individual rubber compositions to form said multi-layered rubber composite through a splice bar and die, forming a composite strip in a single manufacturing step.

The problem of smear may occur as a side effect of co-extrusion. Smear is the appearance of a thin layer (usually a few microns) of a compound at an unexpected location of the multi-layered rubber composite. Smear is generally undesired, and is usually the result of rubber flow at junction or gaps between parts of the co-extrusion equipment. Thus it is desired to have improved manufacturing equipment which substantially reduces or eliminates smear in component co-extrusion manufacturing.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

BRIEF DESCRIPTION OF THE DRAWINGS

The invention will be described by way of example and with reference to the accompanying drawings in which.

DETAILED DESCRIPTION OF THE INVENTION

Figure 1:
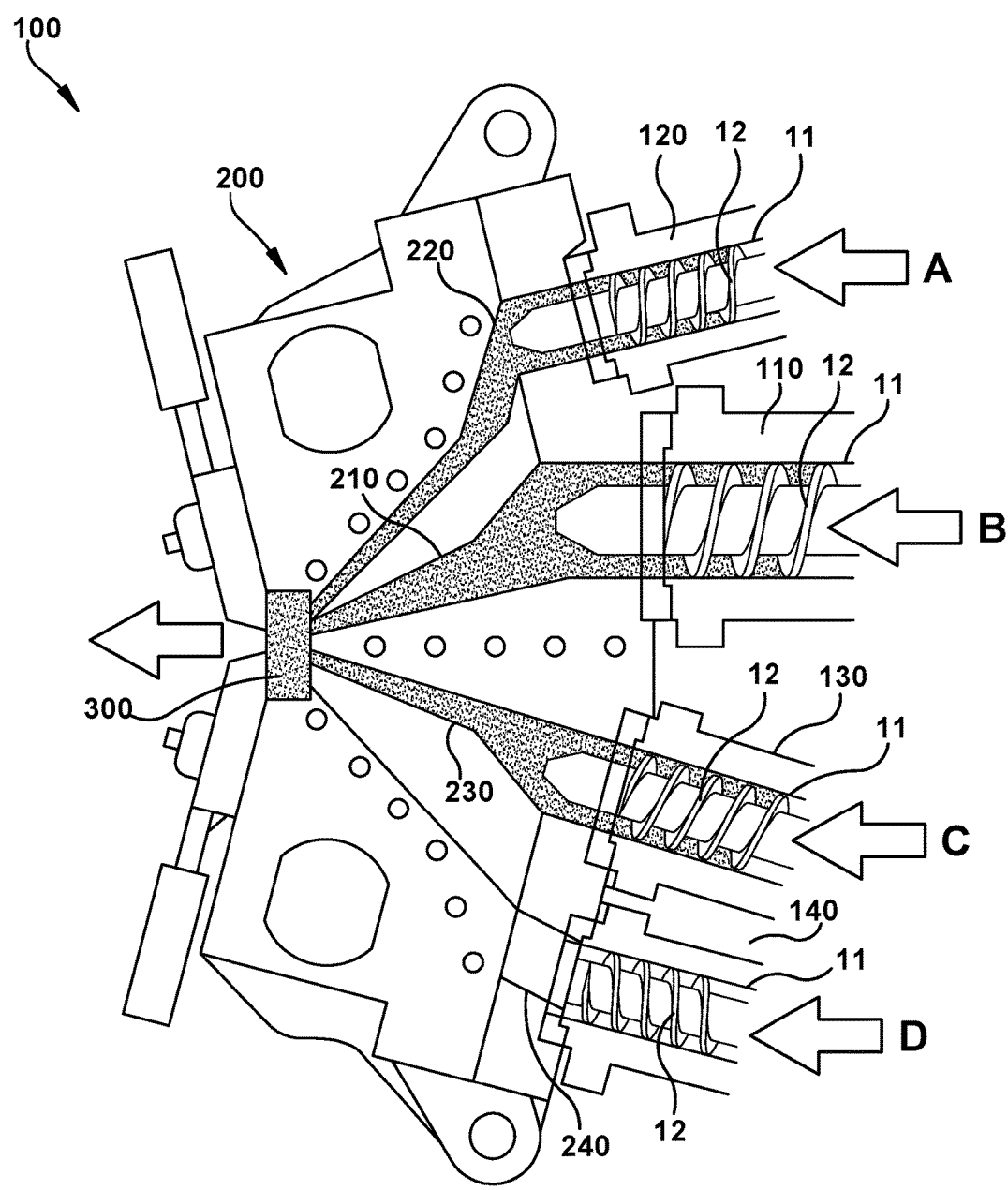
FIG. 1 is a cross-sectional view of a schematic of an extruder head shown with the outlets of extruders A,B, C, and D.

FIG. 1 illustrates an extruder system 100 for forming a multi-layered rubber composite in a single operation. The extruder system includes at least two extruders 110, 120. Screw extruders are typically utilized, although ring extruders may be utilized. FIG. 1 illustrates a piggy back type extruder system, wherein there are four screw extruders 110, 120, 130 and 140 used to form the multi-layered composite. The extruders need not be piggy backed (i.e., the extruders are stacked together, facing the same direction). The extruders may be arranged in a nose to nose configuration, which means the extruders are arranged so that they are facing each other, with the head sitting between the extruders.

Figure 2:
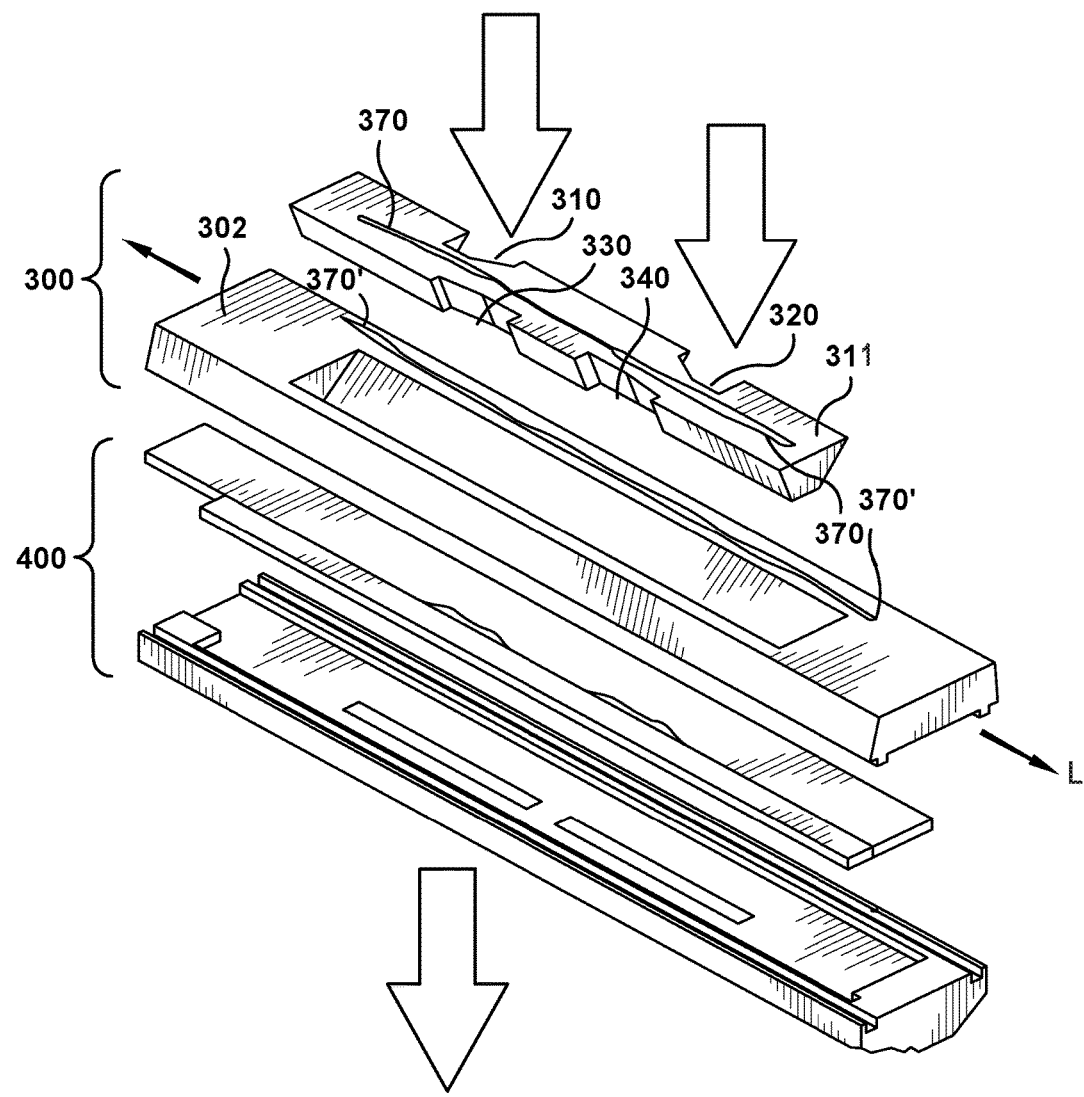
FIG. 2 is an exploded perspective view of a splice bar and die assembly for use with the extruder head of FIG. 1.
Figure 3:
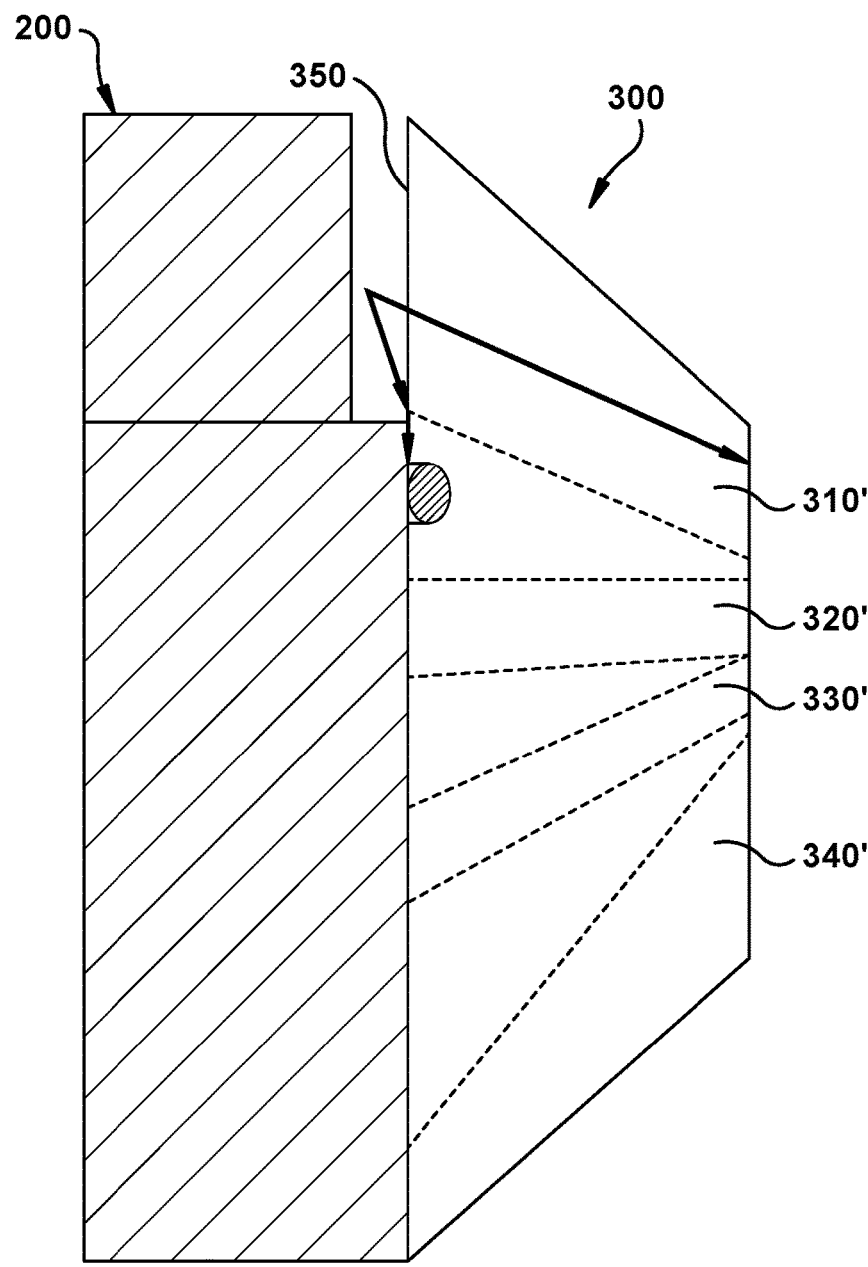
FIG. 3 is a side cross-sectional view of the splice bar and extruder head of FIG. 1.
Figure 4:
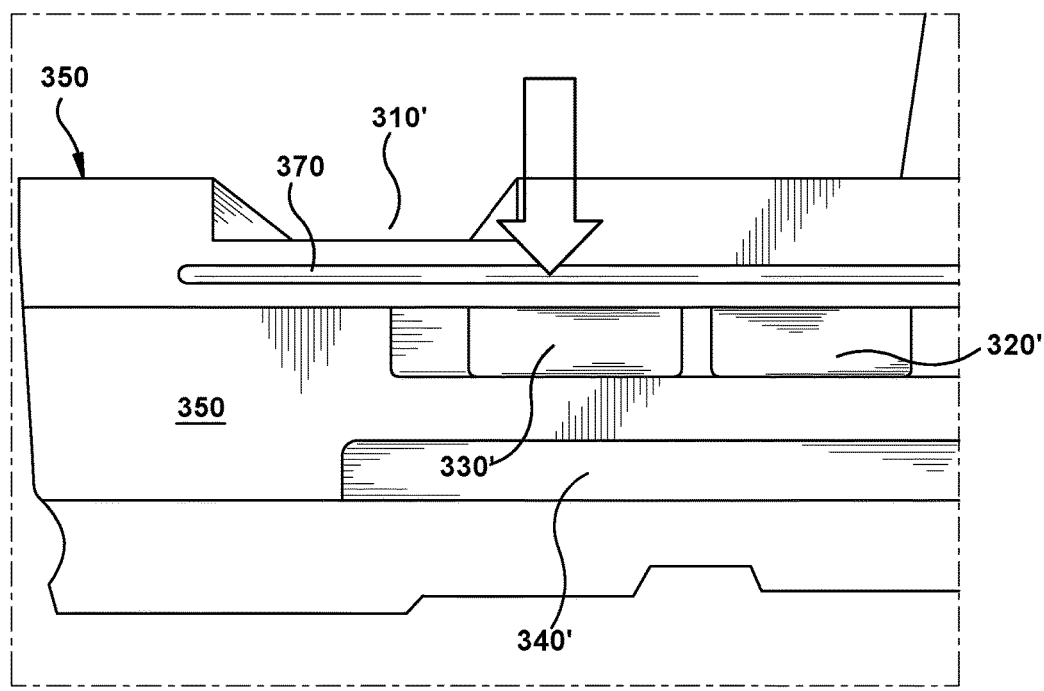
FIG. 4 is a close-up rear view of the splice bar of the present invention.

Each extruder 110, 120, 130, 140 is typically comprised of a cylindrically shaped body 11 that houses an internal screw 12. As the screw 12 rotates, the rubber is advanced forward through the main body. The rubber is masticated as it is worked on via the screw 12. Each extruder 110, 120, 130, 140 typically has a different rubber or elastomer that is being extruded. Each rubber or elastomer stream exits each extruder screw and passes into a respective flow channel 210, 220, 230, 240 of a extruder head assembly 200. Thus there is one flow channel for each extruder screw. Each elastomer stream exits the flow channel and is fed into a splice bar assembly 300. The splice bar assembly 300 as shown in FIG. 2, comprises a rectangular shaped bar 302 with a removable insert 311. The rectangular shaped bar has a longitudinal axis L that extends along the width of the bar. When the insert is inserted into the rectangular shaped bar 302, a plurality of flow passages 310, 320, 330, 340, are formed. A different type of elastomer is typically fed through each extruder 110, 120, 130, 140 the flow of which feeds into flow passages 310, 320, 330, 340 respectively. FIG. 3 illustrates the splice bar and the flow passages in cross-section. The rear face 350 of the splice bar assembly 300 has at least one groove 370 that is positioned between a two flow channels 310, 330. The rear face may comprise additional grooves that separate the flow channels from one another. The groove functions to capture excess flow from one channel, preventing it from flowing into an adjacent channel As the compound remains in the groove, it will increase in hardness as it cures, forming a type of "o ring" seal, which prevents further compound from passing the gap. Thus, the groove in the rear face of the splice bar prevents smear or unwanted leakage of compound from passing into a neighboring flow channel. After the compounds exit the flow passages 310, 320, 330, 340 the flow passes through the die 400, forming a multi-layered composite.

Upon cleaning or inspection, the status of the groove is an indicator of extrusion performance Thus, if the groove is empty, this means the assembly is fluid tight, with no leakage. If the groove is filled with elastomer, it is a warning that indicates a potential extrusion issue and suggests corrective action.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An extruder assembly for forming a multi-layered composite, the extruder assembly comprising: an extruder head having a first and second flow passage, a first and second extruder in fluid communication with the respective first and second flow passage, a splice bar having a first and second passageway extending from a rear side to an outlet side, and communicating flow from the first and second passageway to an outlet die, said splice bar further comprising a groove located on an outer surface of the rear side of the splice bar and being positioned between the first and second passageway, wherein the groove extends from one end of the splice bar to the opposite end, wherein the groove has a thickness in the range of 4-7 millimeters.

2. The extruder assembly of claim 1 wherein the groove extends in alignment with the longitudinal axis of the splice bar.

3. The extruder assembly of claim 1 wherein the groove has a round cross-sectional shape.

4. The extruder assembly of claim 1 wherein the groove extends in alignment with the transverse axis of the splice bar.

5. The extruder assembly of claim 1 wherein the groove extends between the first and second passageway.

6. The extruder assembly of claim 1 wherein the groove has a depth in the range of 4-7 millimeters.

7. The extruder assembly of claim 1 wherein the groove has a radius in the range of 1.5-3.5 millimeters.

* * * * *